United States Patent [19]

Hakes et al.

[11] 4,299,300
[45] Nov. 10, 1981

[54] VEHICLE STEERING BRAKE AND CLUTCH CONTROL

[75] Inventors: Gary A. Hakes, North Brunswick, N.J.; Norma G. Shook, Morton; George W. Cackley, Hanna City, both of Ill.; Stephen D. Burdette, Edina, Minn.; Hugh C. Morris, Peoria, Ill.

[73] Assignee: Caterpillar Tractor Co., Peoria, Ill.

[21] Appl. No.: 29,789

[22] Filed: Apr. 13, 1979

Related U.S. Application Data

[62] Division of Ser. No. 876,581, Feb. 9, 1978, Pat. No. 4,246,992, which is a division of Ser. No. 688,798, May 21, 1976, Pat. No. 4,093,048.

[51] Int. Cl.³ .................. B60K 41/24; B62D 11/08
[52] U.S. Cl. .................................. 180/6.2; 60/435; 180/6.7; 192/13 R
[58] Field of Search ............... 180/6.2, 6.7; 60/435, 60/436; 74/718, 720, 730; 192/4 A, 13 R, 12 C

[56] References Cited

U.S. PATENT DOCUMENTS

| | | | |
|---|---|---|---|
| 2,961,057 | 11/1960 | Johnson | 180/6.2 |
| 2,989,986 | 6/1961 | Scmitt | 137/596.1 |
| 3,374,846 | 3/1968 | Massone | 180/6.7 |
| 3,815,697 | 6/1974 | Bridwell et al. | 180/6.2 |
| 3,837,449 | 9/1974 | Drone | 180/6.7 |
| 3,895,703 | 7/1975 | Schmitt et al. | 192/13 R |
| 3,899,058 | 8/1975 | Pasquini | 192/13 R |

*Primary Examiner*—Joseph F. Peters, Jr.
*Assistant Examiner*—Donn McGiehan
*Attorney, Agent, or Firm*—Phillips, Moore, Weissenberger, Lempio & Majestic

[57] ABSTRACT

A crawler tractor vehicle having steering clutches and associated steering brake includes a control apparatus for each clutch and brake system, including a valve made up of a valve body, and a clutch valving spool and a brake valving spool movably associated therewith. In one embodiment, the clutch valving spool and brake valving spool are identical in configuration, and are disposed in a common bore. Actuator means are associated with such clutch valving spool and brake valving spool, in one embodiment including an actuator assembly made up of a plurality of plungers movable relative to each other and relative to the valve body to provide particular movement of the clutch and brake valving spools. In another embodiment, the actuator means comprise mechanical linkage means, for providing movement of brake and clutch valving spools positioned in respective separate bores defined by the valve body.

9 Claims, 15 Drawing Figures

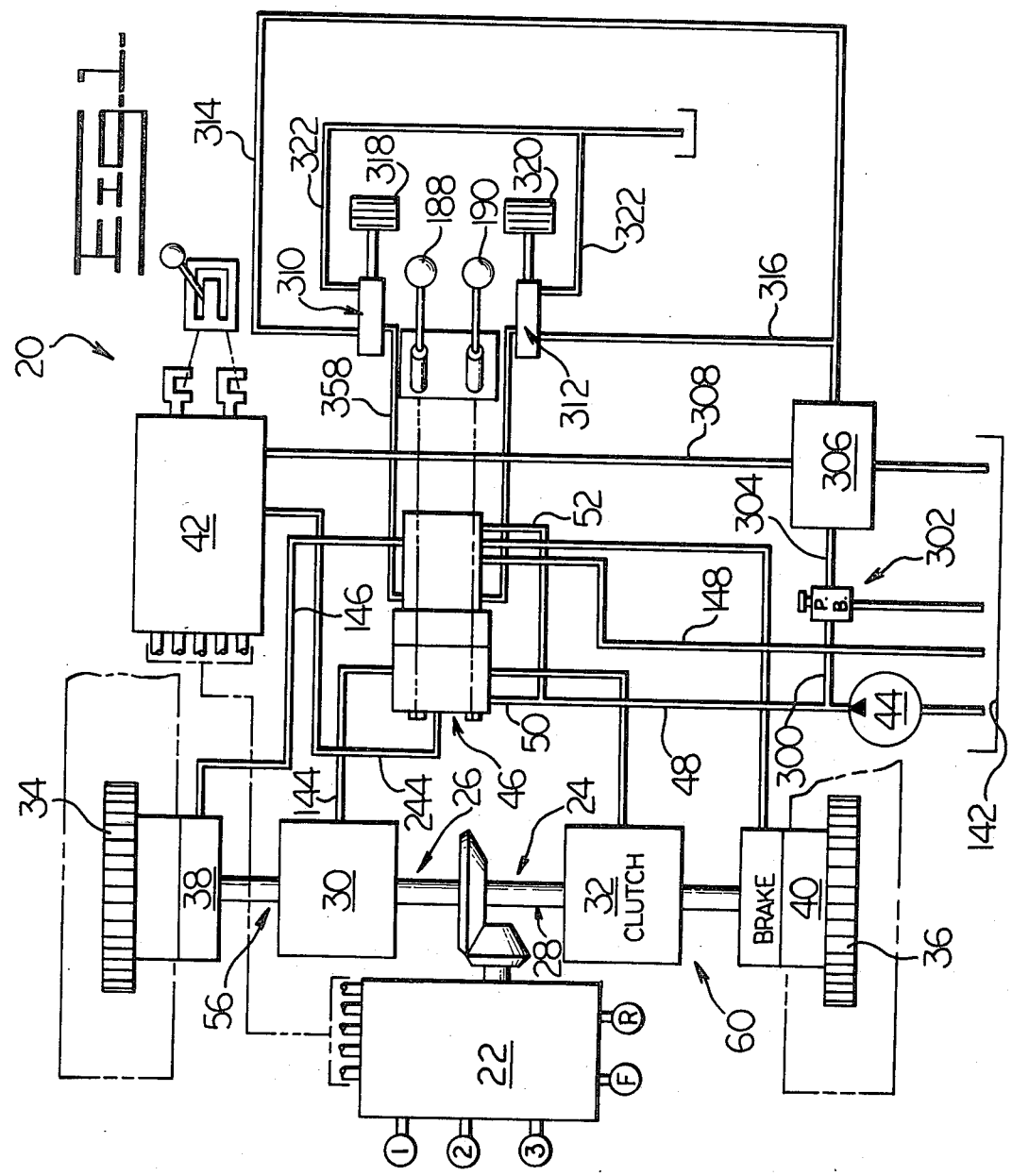

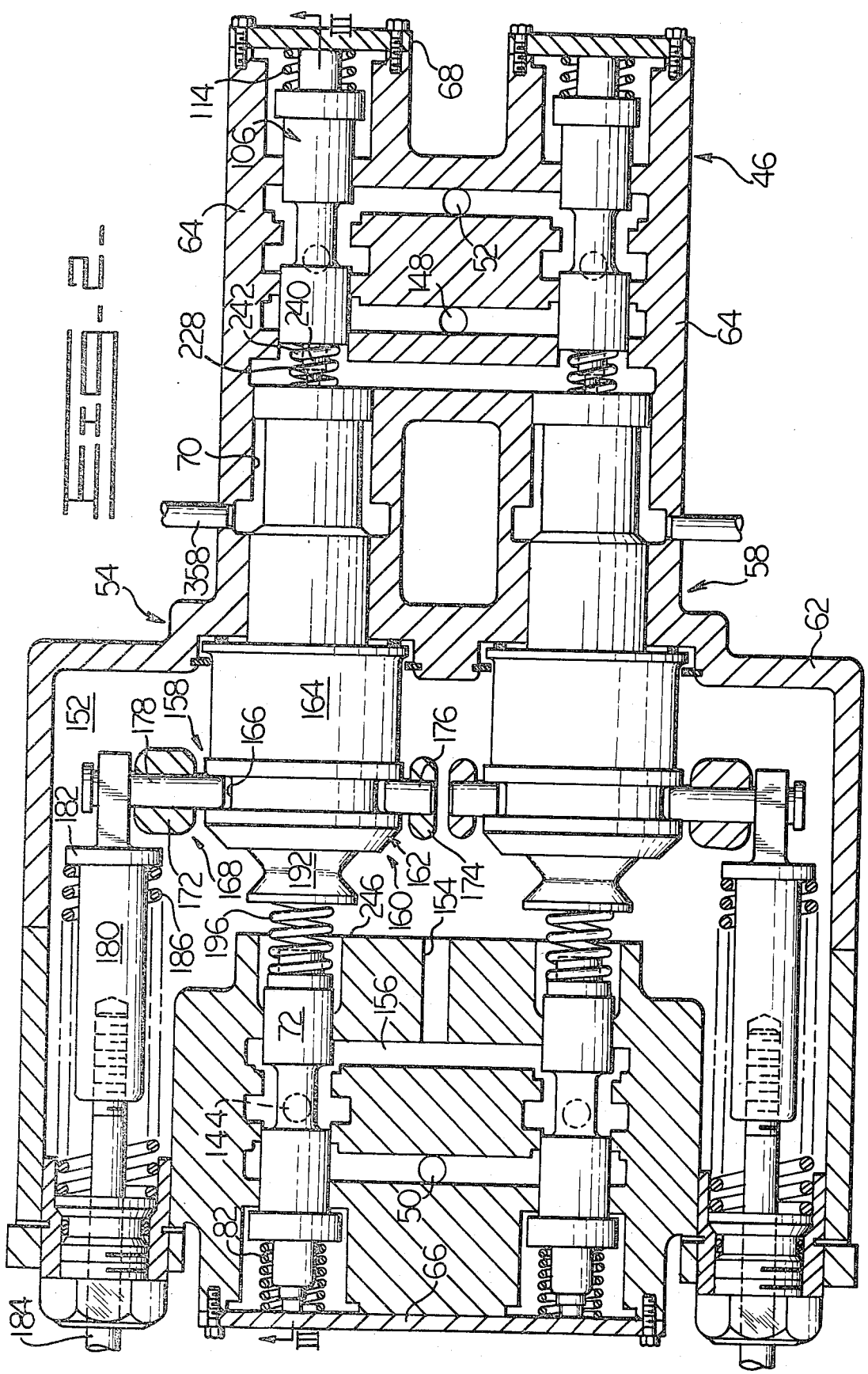

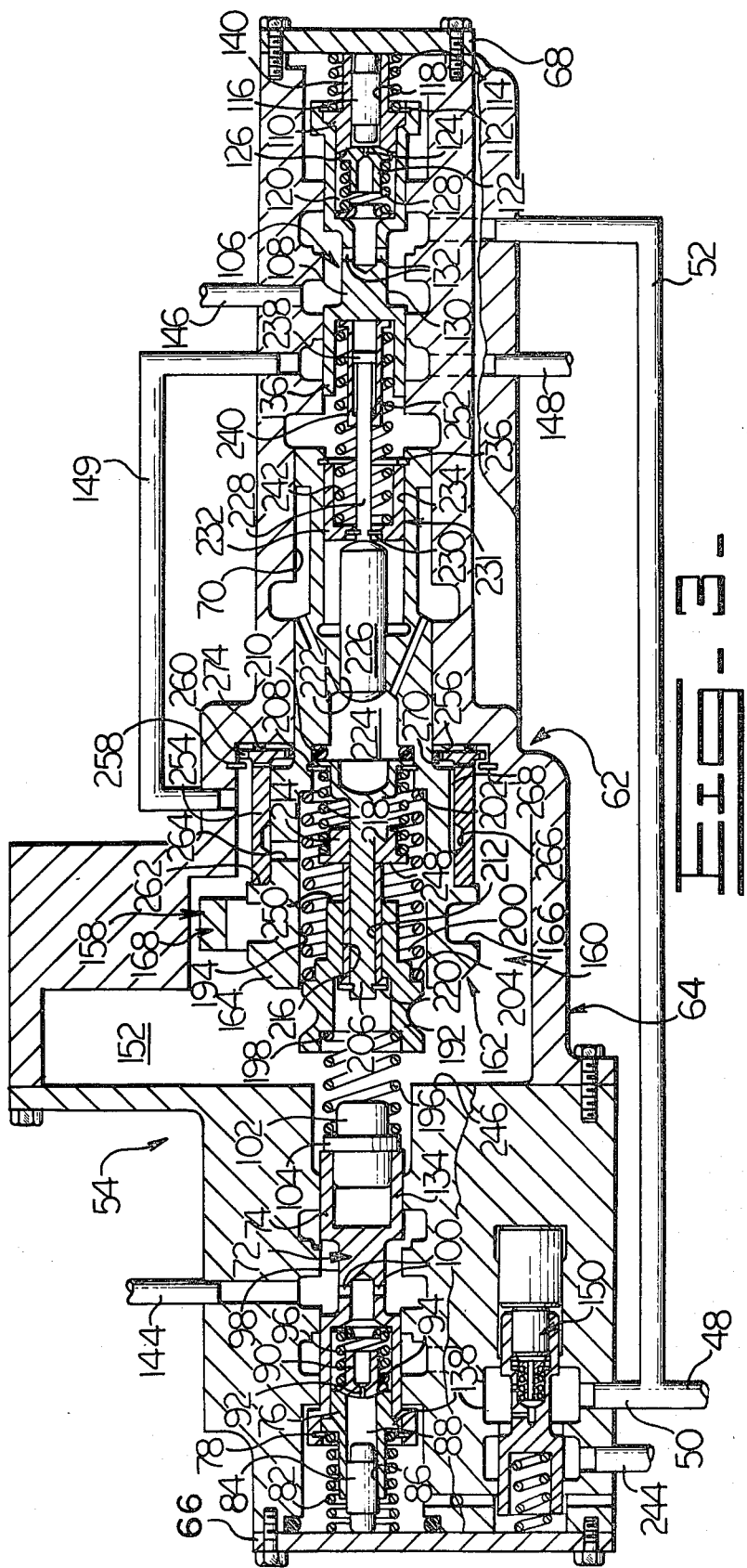

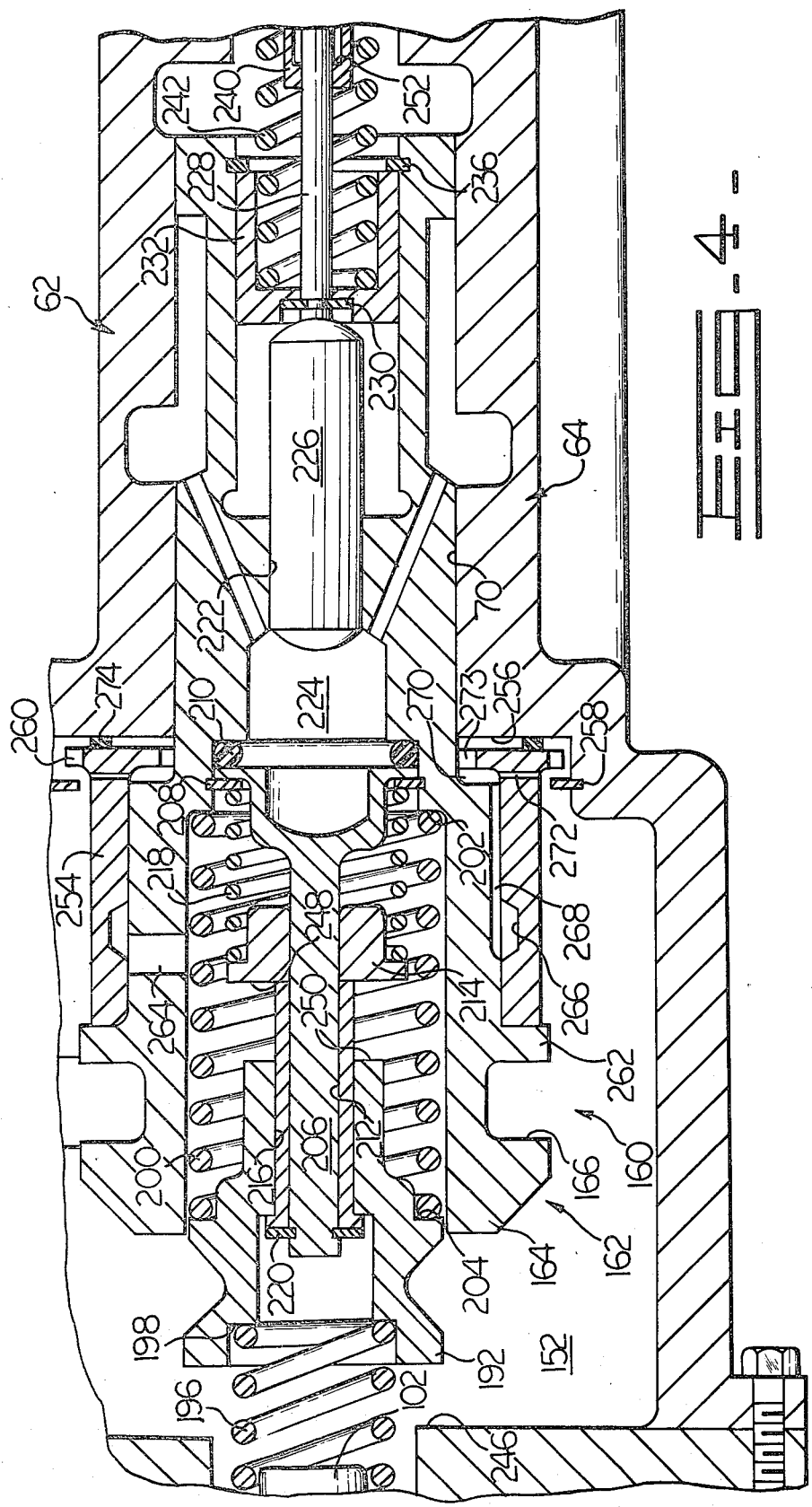
FIG.-4.-

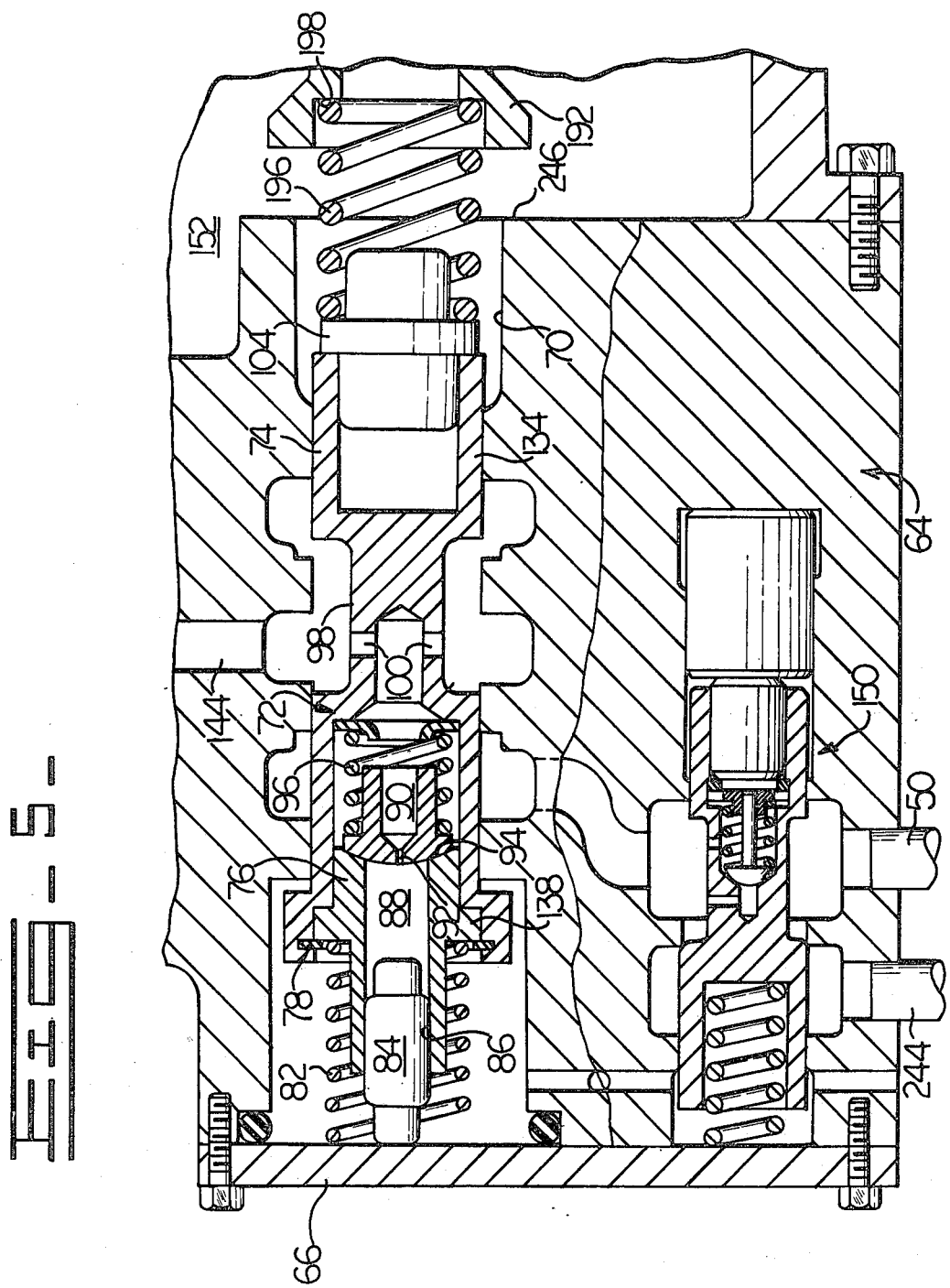

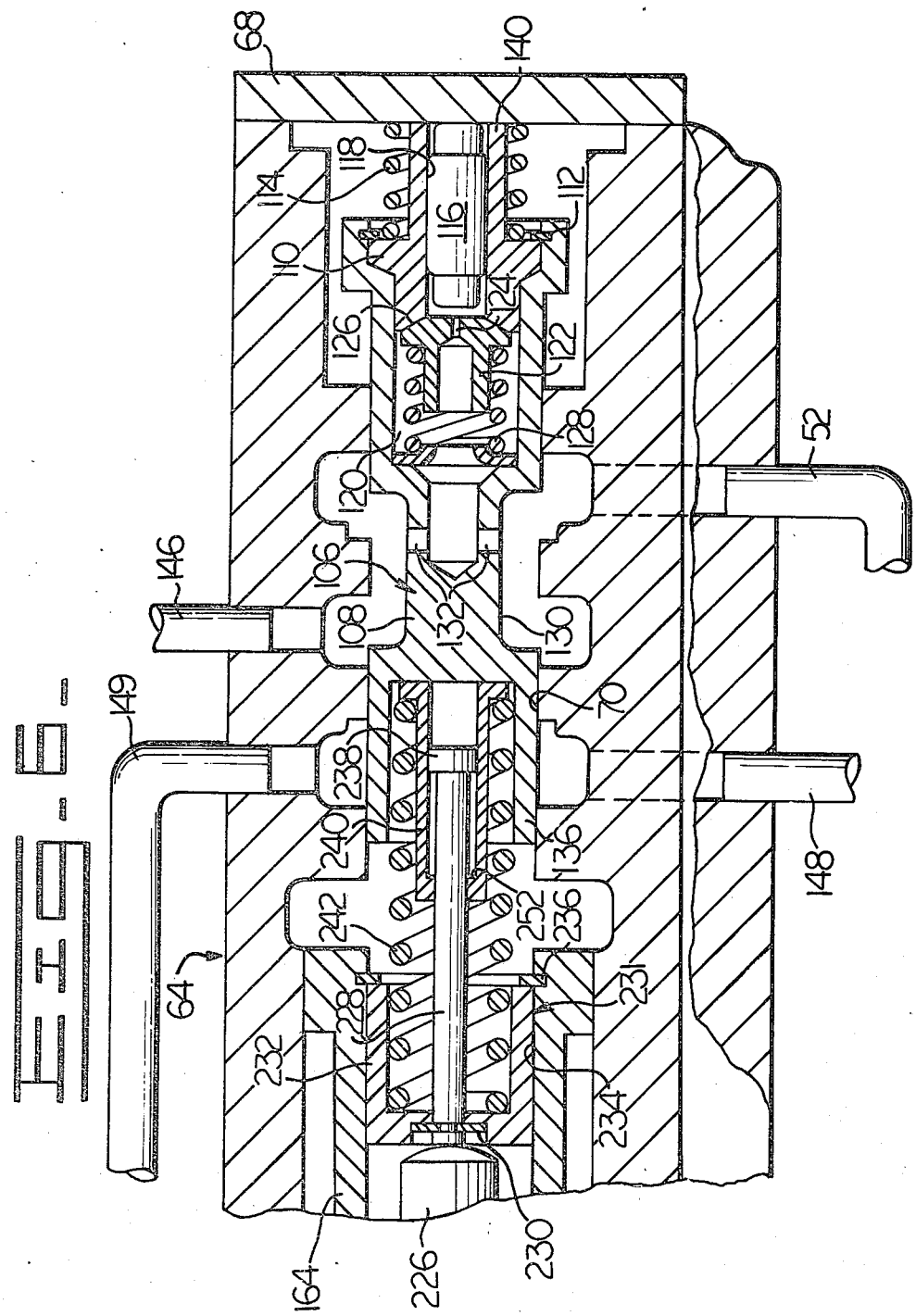

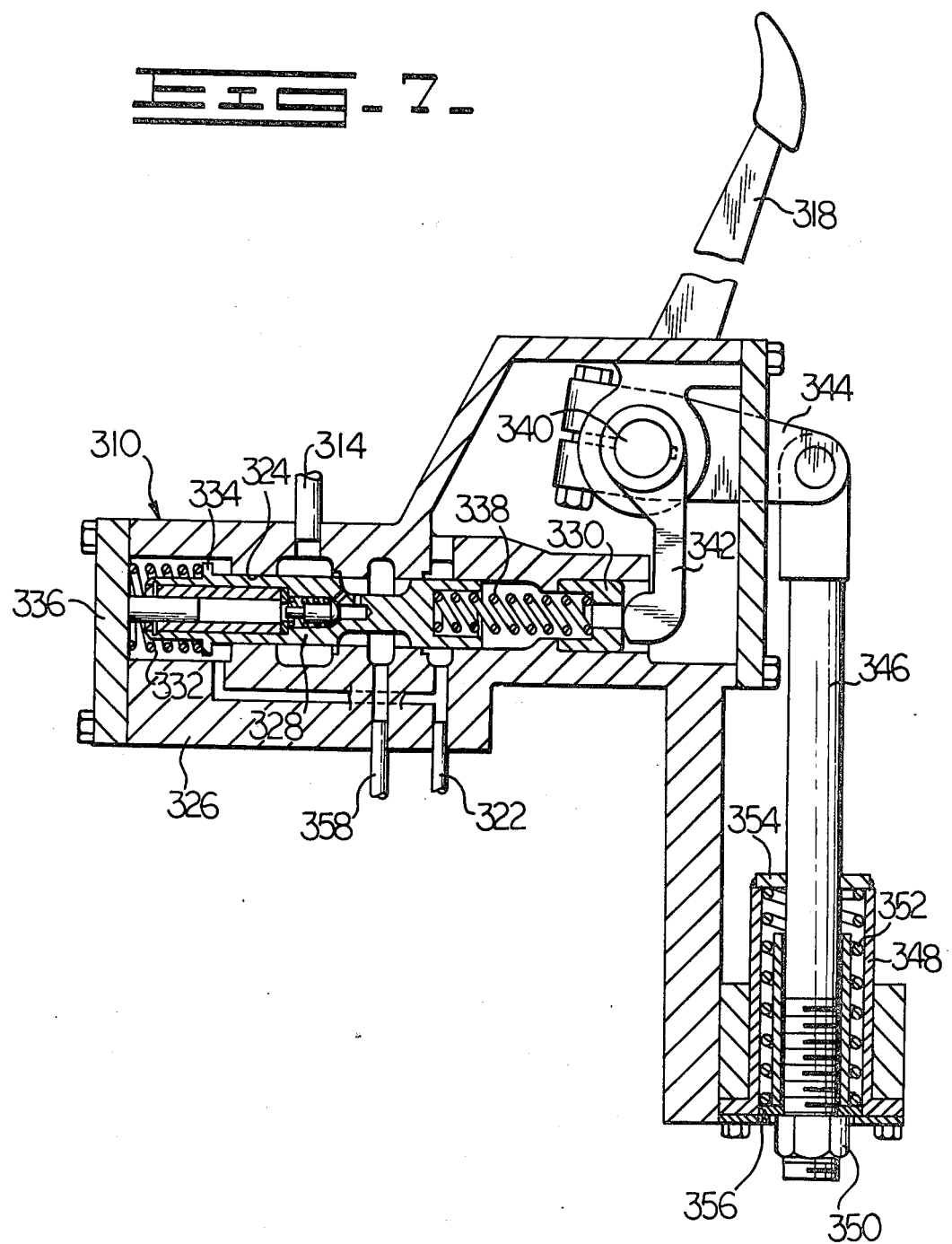

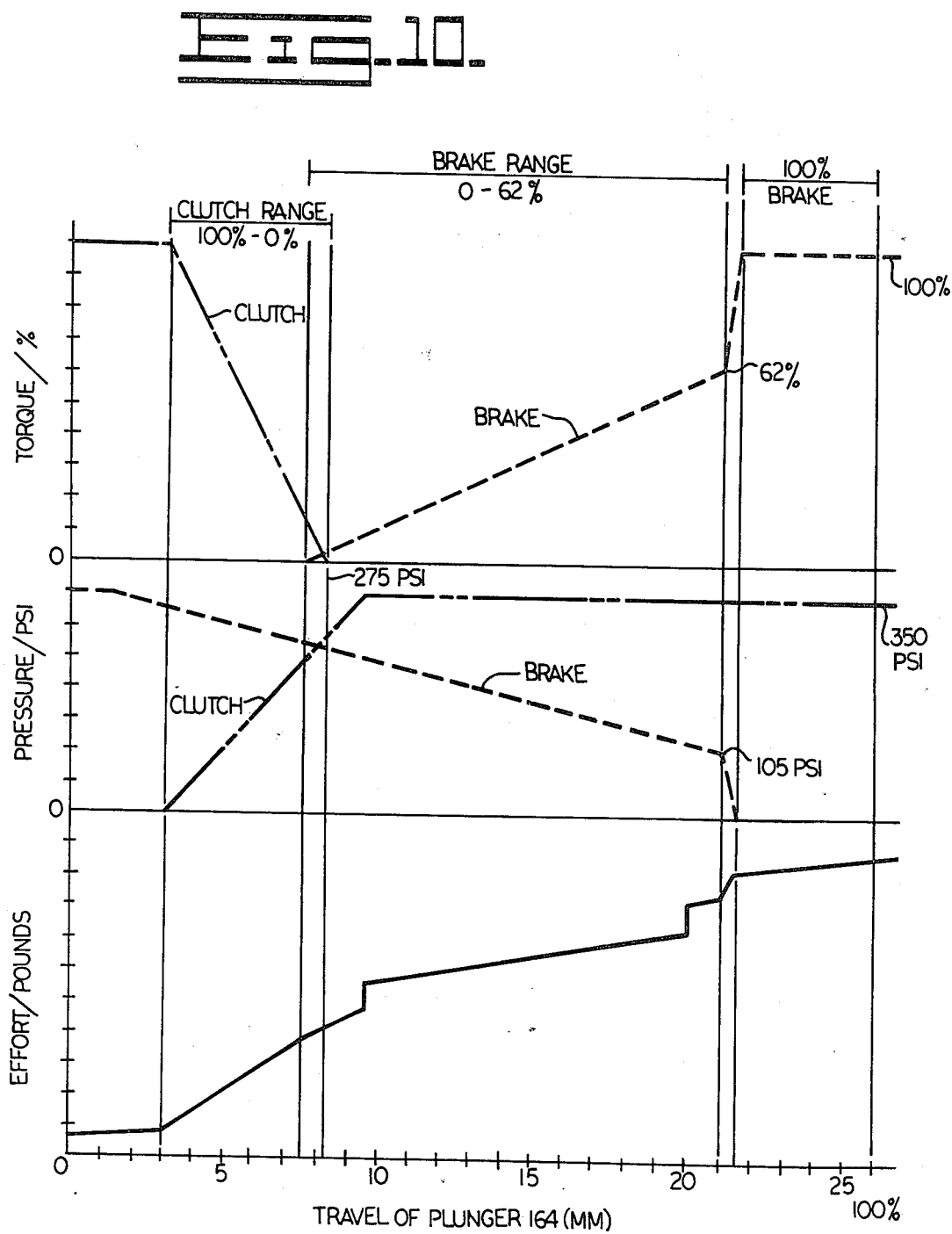

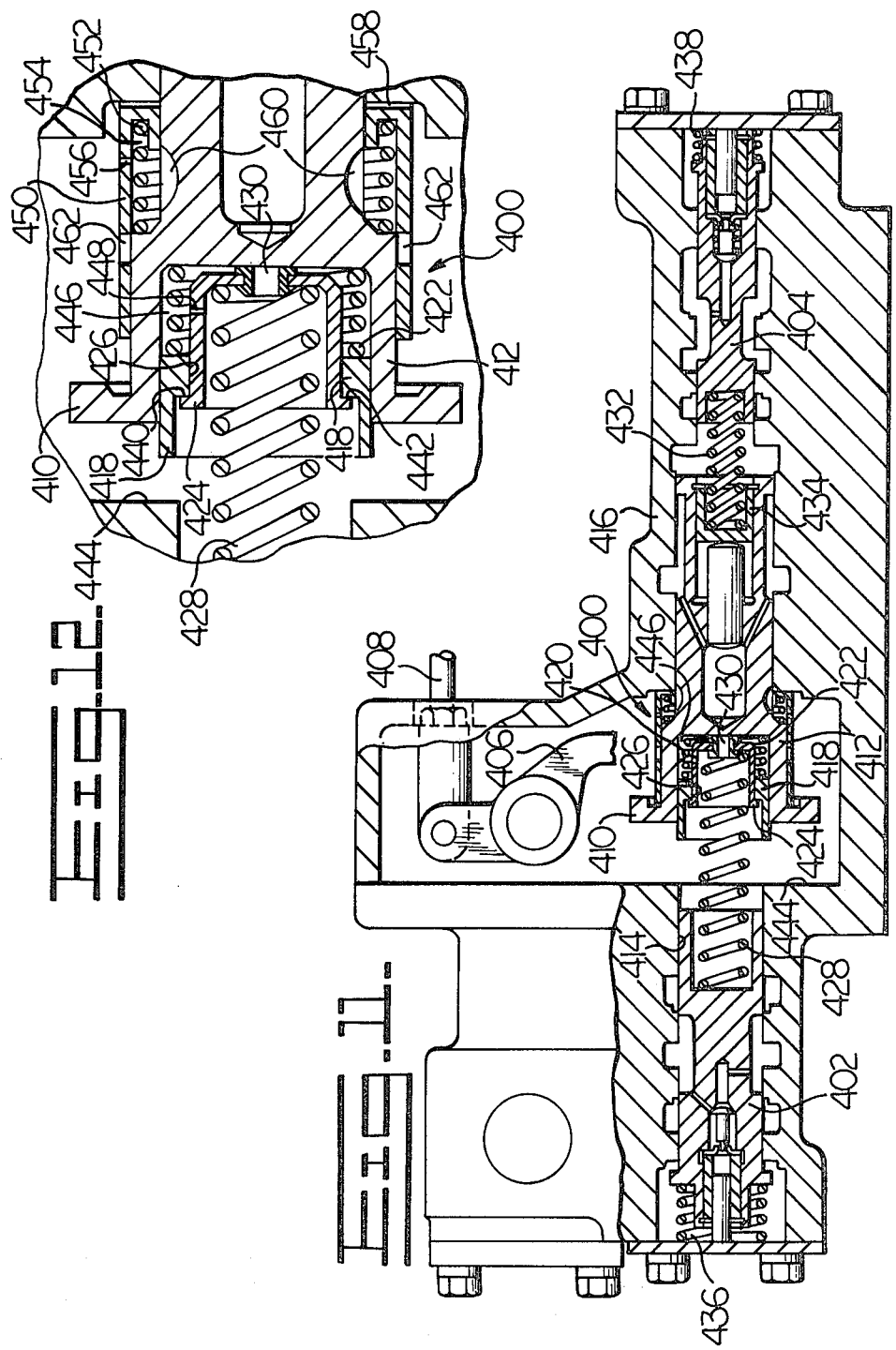

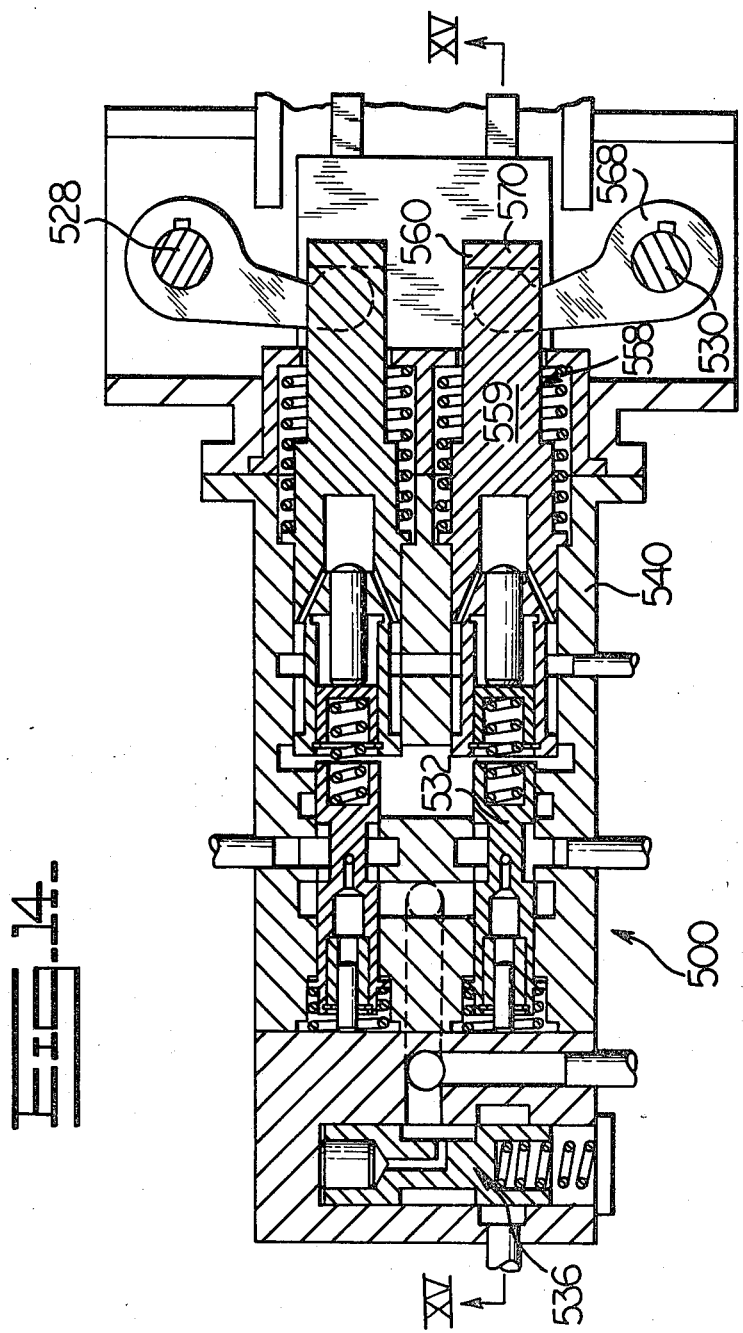

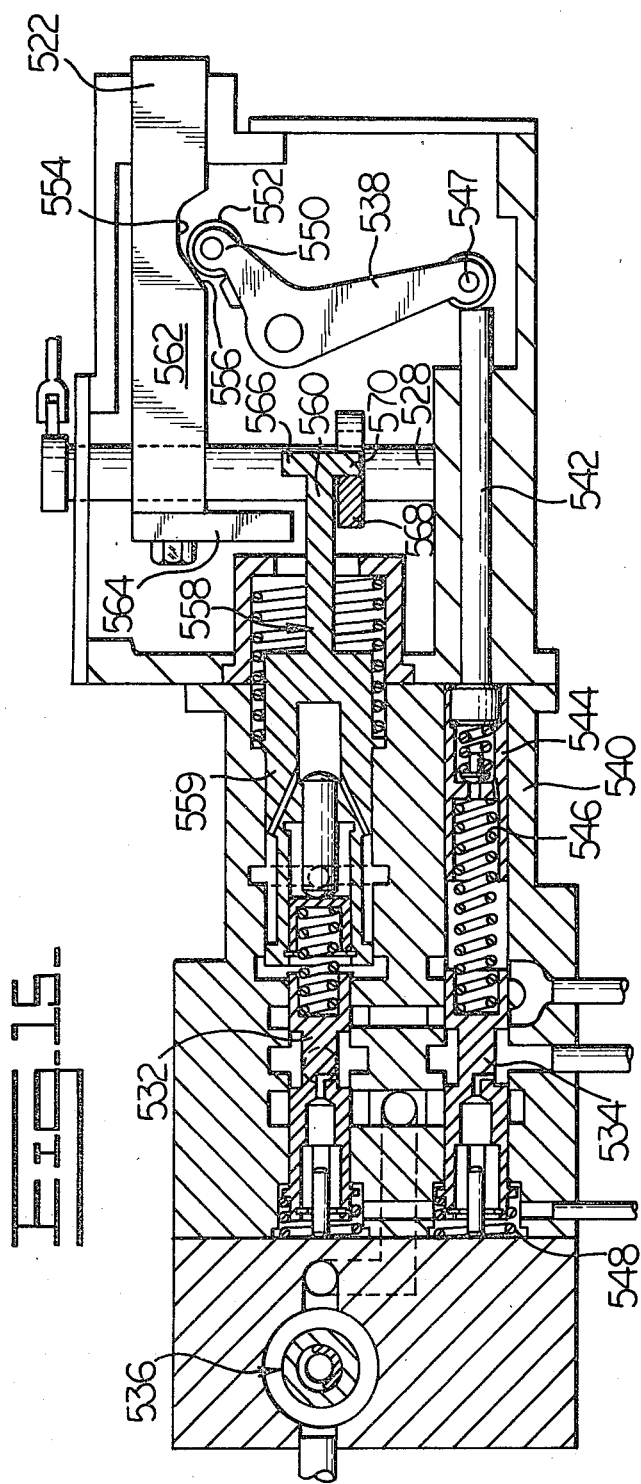

VEHICLE STEERING BRAKE AND CLUTCH CONTROL

CROSS-REFERENCES

The present patent is a division of U.S. Pat. No. 4,246,992, which was issued on Jan. 27, 1981, which patent is itself a division of U.S. Pat. No. 4,093,048, issued on June 6, 1978.

BACKGROUND OF THE INVENTION

This invention relates to steering of tractors and more particularly, to the steering of tractors which include steering clutches and steering brakes.

In track-type tractors steering is accomplished by interrupting the drive to the drive wheel or sprocket on one side or the other of the tractor, and may be assisted by applying a brake selectively to the one or other of the drive components. Examples of such systems are disclosed in U.S. Pat. No. 3,895,703, and U.S. Pat. No. 3,899,058, both assigned to the assignee of this invention. Further of interest are U.S. Pat. No. 2,433,443, U.S. Pat. No. 3,376,846, and British Pat. No. 1,218,526, each of which disclose a system of the above generally described type. While such systems have been found relatively effective for the particular environmental structures with which they are to be combined, it is to be understood that it is always highly desirable to further increase the operating efficiency of such a system to provide particular results, meanwhile insuring that such a system is simple, relatively inexpensive, reliable, and highly efficient. Particular attention should be paid to the ease of construction of such a system, combined with the overall simplicity thereof. Additionally, attention should be paid to providing the operator of the vehicle information of the status of the system and its effect on the vehicle during the continuing actuation process of a system. That is, for example, it is deemed highly desirable that the operator of such a system be aware of the fact that he is in a transition stage between one drive state of the vehicle and another, or that he is approaching such a drive transition stage. While certain of the above systems attempt to deal with such problems, it will be understood that particular structure which provides the operator with proper and accurate information as to the state thereof is highly desirable.

Of more general interest in this area is U.S. Pat. No. 2,989,986 (assigned to the assignee of this invention), which discloses a hydraulic control valve for actuating steering clutches.

SUMMARY OF THE INVENTION

It is accordingly an object of this invention to provide, in a vehicle having steering clutches and associated steering brakes, control means which sequentially effect disengagement of a steering clutch and then actuation of an associated steering brake.

It is a further object of this invention to provide, in a vehicle having steering clutches and steering brakes, a control system which, while fulfilling the above object, is extremely simple in design and efficient in use.

It is a still further object of this invention to provide, in a vehicle having steering clutches and steering brakes, a system which provides a feedback of information to the operator of the vehicle so that such operator can determine the state of such control system.

Broadly stated, the invention is in a vehicle in which driving force is applied to both sides thereof, including clutch and brake systems associated respectively with both sides thereof and responsive to fluid pressure from a source thereof, for steering of the vehicle. Each clutch and brake system is associated with a side of the vehicle, and comprises clutch means disengageable to disconnect the driving force applied to that side of the vehicle and engageable to connect the driving force to that side of the vehicle, and brake means actuatable to brake that side of the vehicle and releasable to release that side of the vehicle. The invention comprises a control apparatus for each clutch and brake system comprising a valve comprising a valve body defining a bore, and first and second valving spools movably disposed within and along said bore. The invention further comprises first means for providing fluid communication between the source and the valve body bore, and second means for providing fluid communication between the valve body bore and the blutch means. Further included are third means for providing fluid communication between the valve body bore and the brake means, and fourth means for providing fluid communication from the valve body bore and through which fluid pressure may be released from the valve body bore. The first valving spool is movable within the bore to first and second positions relative to the valve body, the first valving spool in one of the first and second positions allowing release of fluid pressure from the clutch means through the second means for providing fluid communication and the fourth means for providing fluid communication. The first valving spool in the other of the first and second positions provides communication of fluid pressure from the source through the first means for providing fluid communication, through the second means for providing fluid communication, to the clutch means. The second valving spool is movable within the bore to first and second positions relative to the valve body, the second valving spool in one of the first and second positions providing communication of fluid pressure from the source through the first means for providing fluid communication, through the third means for providing fluid communication, to the brake means, the second valving spool in the other of the first and second positions allowing release of fluid pressure from the brake means through the third means for providing fluid communication, and the fourth means for providing fluid communication. Further included are actuator means operatively coupled with the first and second valving spools so that movement of the actuator means in one direction provides movement of the first and second valving spools to their respective first positions, and movement of the actuator means in another direction provides movement of the first and second valving spools in their respective second positions.

BRIEF DESCRIPTION OF THE DRAWINGS

These and other objects of the invention will become apparent from a study of the following specification and drawings, in which:

FIG. 1 is a schematic view of a first embodiment of a control system as applied to a vehicle;

FIG. 2 is a sectional plan elevation of the control valve means of the system of FIG. 1;

FIG. 3 is a sectional view taken along the line III—III of FIG. 2;

FIG. 4 is an enlarged view of the actuator plunger means of FIG. 3;

FIG. 5 is an enlarged view of the clutch spool area of the control valve of FIG. 3;

FIG. 6 is an enlarged view of the area of the brake spool of FIG. 3;

FIG. 7 is a sectional elevation of a portion of the apparatus of FIG. 1 for independently operating the brakes of the vehicle;

FIG. 10 is a graphical illustration of various parameters of the system of FIGS. 1–9 illustrating the operation thereof;

FIG. 11 is a view similar to that shown in FIG. 3, but of an alternative embodiment of control valve shown therein;

FIG. 12 is a view of an enlarged portion of the plunger means of FIG. 11;

FIG. 14 is a view similar to that shown in FIG. 2, but of yet another alternate embodiment of control valve; and FIG. 15 is a view taken along the line XV—XV of FIG. 14.

DESCRIPTION OF THE PREFERRED EMBODIMENTS

Figure 9:
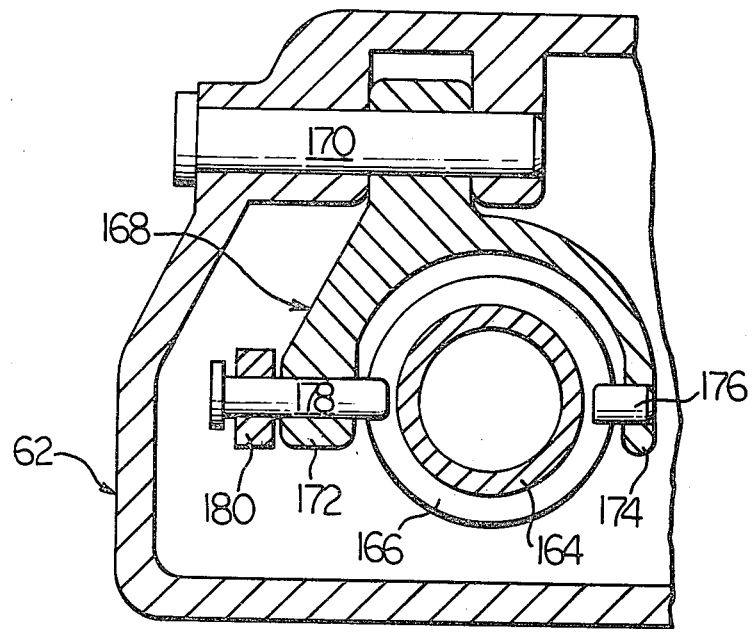
FIG. 9 is a sectional view of a portion of the actuator means for moving the plunger means of the apparatus.

Shown in FIG. 1 is an overall system 20 for actuating the steering clutches and brakes of a vehicle (not shown). The engine of the vehicle drives through a multi-speed transmission 22 and through gears 24 to drive axle portions 26,28. The axle portions 26,28 includes respective clutches 30,32 of the type which are engaged upon release of fluid pressure therefrom, and released upon application of fluid pressure thereto. Engagement of clutch 30 provides that power is transmitted therethrough to drive sprocket 34 on one side of the vehicle, and engagement of clutch 32 provides that power is transmitted therethrough to drive sprocket 36, on the other side of the vehicle. The power applied to the sprockets 34, 36 acts, of course, as driving force for the vehicle, propelling along crawler tracks indicated by broken lines.

The sprocket 34 also has associated therewith a brake 38 which is of the type which is applied upon release of fluid pressure therefrom, and released upon application of fluid pressure thereto. Application of such brake 38 retards movement of the sprocket 34, and release of such brake 38 allows the sprocket 34 to rotate freely upon power applied thereto through the clutch 30. The sprocket 36 also has a brake 40 associated therewith, which is also engaged upon release of fluid pressure thereto and released upon application of fluid pressure thereto. Such brake 40 of course operates in a manner similar to the brake 38 previously described, but in association with the sprocket 36. A transmission selector control 42 is included in the system, for providing that appropriate transmission speeds, i.e., first, second, and third speeds, and appropriate directions, i.e., forward and reverse, can be selected.

A fluid pump 44 is included in the system, to supply pressurized fluid to a control valve 46 through conduits 48,50,52. Such control valve 46 is shown in detail in FIGS. 2 and 3. As shown therein, the control valve 46 includes a control valve portion 54 for controlling the clutch and brake system 56 including clutch 30 and brake 38, and a control valve portion 58 for controlling the clutch and brake system 60 including clutch and brake 32,40. As such control valve portions 54,58 are identical in structure and operation, only the control valve portion 54 will be described in detail.

The control valve portion 54 is made up of a valve body 62 made up of a main body portion 64 and end plates 66,68 fixed thereto and defining an elongated bore 70. Disposed within the bore 70 adjacent one end thereof is a first valving spool 72 (FIGS. 3 and 5), which is movable along and within the bore 70. The valving spool 72 is made up of a main valving spool portion 74 and an end portion 76 secured thereto by means of a snap ring 78 disposed in a groove defined by the main portion 74. A resilient helical spring 82 is disposed between the end plate 66 and valving spool 72 as shown. A slug 84 is disposed in a bore 86 defined by the spool 72, and is positioned to bear against the end plate 66. The bore 86 communicates with an inner spool chamber 88, and positioned in the inner spool chamber 88 is a valve poppet 90 defining a passage 92 therethrough. The valve poppet 90 is seatable against a seat portion 94 defined by the valving spool 72 therewithin, and such poppet 90 is biased into a seating position by a resilient spring 96 within the chamber 88. The valving spool 72 defines an annular recessed portion 98 between the ends thereof, and radial ports 100 communicate the recessed portion 98 with the chamber 88. The opposite end of the valving spool has associated therewith a slug 102 which defines a radial lip 104 which seats on the end of such valving spool 72.

At the opposite end of the bore, and positioned movably therewithin and therealong, is another or second valving spool 106 (FIGS. 3 and 6). The valving spool 106 is made up of a main valving spool portion 108 and an end portion 110 secured thereto by means of a snap ring 112 disposed in a groove defined by the main portion 108. A resilient helical spring 114 is disposed between the end plate 68 and valving spool 106 as shown. A slug 116 is disposed in a bore 118 defined by the spool 106, and is positioned to bear against the end plate 68. The bore 118 communicates with an inner spool chamber 120, and positioned in the inner spool chamber 120 is a valve poppet 122 defining a passage 124 therethrough. The valve poppet 122 is seatable against a seat portion 126 defined by the valving spool 106 therewithin, and such poppet 122 is biased into a seating position by a resilient spring 128 within the chamber 120. The valving spool 106 defines an annular recessed portion 130 between the ends thereof, and radial ports 132 communicate the recessed portion 130 with the chamber 120.

It is to be noted that the valving spools 72,106 are identical in configuration, with end 134 of valving spool 72 being substantially identical to corresponding end 136 of valving spool 106, and end 138 of valving spool 72 being substantially identical to corresponding end 140 of valving spool 106. The valving spools 72,106 are positioned so that the end 134 is most adjacent the end 136. That is, the valving spool 106 is positionally reversed relative to the valving spool 72 for movable association with the valve body 62.

Referring to FIGS. 1, 2 and 3, it is to be seen that the conduits 50,52 are actually branch conduits for providing fluid communication between the source 142 and the valve body bore 70. A conduit 144 provides fluid communication between the valve body bore 70 and the clutch 30. Yet another conduit 146 provides fluid communication between the valve body bore 70 and the brake 38. Fluid pressure may be released from the valve body bore 70 through the conduit 148, which communicates the valve body bore 70 with tank 142. The branch conduit 50 which supplies pressure to the bore 70 is associated with a priority valve 150 the operation of which will be described in detail.

The valve body 62 defines an inner chamber 152 filled with fluid, which is also communicated to tank 142 through conduit 149, communicating with conduit 148. Such inner chamber 152 communicates through passages 154,156 (FIG. 2) with yet another area of the bore 70, adjacent the valving spool 72.

It will be seen that the valving spool 72 is movable within the bore 70 to a first position, i.e., rightward in FIG. 3, relative to the valve body 62 to allow release of fluid pressure from the clutch 30 through the conduit 144 and through the passages 156,154, chamber 152, and conduits 149,148. The valving spool 72 is movable to a second position relative to the valve body 62, i.e., leftward in FIG. 3, for providing fluid communication of fluid pressure by means of the pump 44 associated with the source 142, through the conduits 48,50, and through the conduit 144 to the clutch 30, to disengage the clutch 30.

It will further be seen that the valving spool 106 is movable to a first position relative to the valve body 62, i.e., rightward relative thereto, to provide communication of fluid pressure from the pump 44 through the conduits 48,52 and through the conduit 146 to the brake 38, to release the brake 38. The valving spool 106 is movable to a second position, i.e., leftward relative to the valve body 62 as shown in FIG. 3, to release fluid pressure from the brake 38 through the conduit 146 and through the conduit 148, to apply the brake 38.

Disposed within the chamber 152 defined by the valve body 62 are actuator means 158 operatively coupled with the valving spools 72,106. The actuator means 158 comprise an actuator assembly 160 (FIGS. 3 and 4) positioned generally between the valving spools 72,106, and aligned therewith along the bore 70. The actuator assembly 160 includes a plunger assembly 162 including an outer first plunger 164 defining an annular groove 166 thereabout. A yoke 168 is pivotally mounted to the valve body 62 by means of a transverse pin 170 (FIG. 9), and the arms 172,174 of the yoke 168 extend upwardly to either side of the plunger 164. A pin 176 is secured to the arm 174, and is disposed in the groove 166 on one side of the plunger 164, and a pin 178 is likewise secured to the arm 172 and extends inward of the groove 166 on the other side of the plunger 164. Pivotally secured to the outer end of the pin 178 is a shaft 180 defining a radial flange 182, and a cable 184 is threadably secured to the shaft 180 and extends outwardly of the valve body 62. A resilient helical spring 186 is disposed between a portion of the valve body 62 and the flange 182, to urge the shaft 180 and cable 184 relatively rightwardly as shown in FIG. 2. It will be seen that movement of the cable 184 leftwardly in FIG. 2 pivots the yoke 168 to move the plunger 164 leftwardly against the resilience of the spring 186.

The cable 184 is associated with a hand control 188 through well-known means, and of course a like cable is associated with the other valve control portion 58 for association with the brake 40 and clutch 32, to be mechanically interconnected with another hand control 190 in a well-known manner.

It will be seen that movement of the hand control 188 in one direction moves the plunger 164 leftwardly (FIG. 3), and movement of the hand control 188 in the other direction moves the plunger 164 rightwardly, the plunger 164 actually being movable along the bore 70 defined by the valve body 62.

A second plunger 192 (FIGS. 3 and 4) is positioned adjacent the plunger 164, and is movable relative thereto within a bore 194 defined by the plunger 164, and also along the bore 70 defined by the valve body 62. A resilient helical spring 196 interconnects the radial lip 104 defined by the slug 102 associated with the valving spool 72, and a face 198 defined by the plunger 192. A resilient helical spring 200 interconnects a face 202 defined by the plunger 164 and a face 204 defined by the plunger 192 to urge them relatively apart. The plunger 164 defines a guide member 206 which is actually a separate member secured to the plunger 164 by means of a snap ring 208, and disposed on an O-ring 210. The guide member 206 is disposed through a bore 212 in a third plunger 214, with the third plunger 214 being movable along the guide member 206 for guiding movement of the third plunger 214 relative to the plunger 164. The guide member 206 and plunger 214 are disposed through a bore 216 defined by the second plunger 192 and movable therewithin and relative thereto. The helical spring 82 (FIGS. 2 and 3) urges the valving spool 72 toward the plunger 164, and the helical spring 114 urges the valving spool 106 toward the plunger 164. A helical spring 218 interconnects the plunger 214 and plunger 164 to urge them relatively apart. Retaining means in the form of a snap ring 220 (FIG. 4) is secured to the end of the guide member 206 for limiting movement of the plunger 214 and plunger 192 relative to the plunger 164 under the urging of the resilient means 200,218.

The plunger 164 defines a bore 222 (FIGS. 3 and 4) which communicates with a chamber 224, and a slug 226 is reciprocably disposed within the bore 222. Upon pressurization of the chamber 224 in a manner to be described, the slug 226 is moved rightwardly (FIG. 3) to bear against the end of a piston spring capsule rod 228. The spring capsule rod 228 makes up part of a spring capsule 231 which consists of guide 232, helical spring 242, sleeve or cylinder 240, rod 228 and snap ring 230. The rod 228 passes through an opening in guide 232, which guide 232 being reciprocably disposed within a bore 234 defined by the plunger 164, and pressurization of such chamber 224 moves the slug 226 rightwardly to move the rod 228 rightwardly to bring the guide 232 into engagement with a snap ring 236 (FIGS. 3 and 4) secured to the plunger 164 within the bore 234. The piston head 238 (FIG. 3) on piston rod 228 is reciprocably mounted in the cylinder 240, which bears against the valving spool 106. The helical spring 242 is disposed about the piston and cylinder assembly 228,238,240, and urges the plunger 164 and valving spool 106 relatively apart.

Through such means described, it will be seen that the rod 228 is operatively coupled with the plunger 164 and the cylinder 240 is operatively coupled with the valving spool 106.

As stated above, means will be described further on by which pressure is applied to and maintained in the chamber 224, and by which pressure may be released from the chamber 224. For describing the following operation, it should be assumed, however, that pressure is being maintained in the chamber 224 to maintain the slug 226 in a rightward position, to in turn maintain the guide 232 against the snap ring 236.

With the parts as shown in FIG. 3, the spring 200 and the spring 218 are being held in a preloaded state. Application of fluid pressure through branch conduit 50 applies fluid pressure to the valving spool 72, but such fluid pressure is blocked from reaching the clutch 30 which is in an engaged state. Fluid pressure is also applied from the source through the branch conduit 52, and into the bore 70 of the valve body 62 adjacent the valving spool 106. Pressure is supplied therefrom through the conduit 146 to the brake 38 to build up pressure therein, tending toward a releasing of the brake 38. Upon pressure build up in the area of the ports 132, pressure also builds up in the chamber 120 (FIGS. 3 and 6) and through the passage 124 to act against the slug 116, moving the valving spool 106 leftwardly (FIG. 3) until the valving spool 106 reaches a balance point wherein sufficient pressure is being supplied to the brake 38 to release such brake 38. It is to be noted that upon such sufficient pressure reaching the brake 38 to release such brake, the priority valve 150 moves leftwardly to an extent to allow pressure into conduit 244, communicating the bore of such priority valve 150 to supply operating fluid pressure to the selector control 22 and transmission 42. Such priority valve 150 is included to preclude the possibility that, as the clutches in the transmission 42 fill during a transmission shift, the brake pressure might drop to cause the brake 38 to engage. Through such priority valve 150, it is insured that pressure to the transmission 42 to fill such transmission clutches is cut off if the pressure supplied to the brake 38 fails below a certain level. That is, a certain level of fluid pressure is supplied to the brake 38 to provide for disengagement thereof prior to fluid pressure being supplied to the selector control 22 and transmission 42.

An an alternative, the priority valve could be deleted, and a flow restrictor could be placed in a line to limit back flow of fluid from the brake 38, but with such restrictor being positioned so that upon a drop of supply fluid pressure, the pressure supplied to the transmission directly drops therewith, i.e., the restrictor is positioned to restrict flow from the brake, and not from the transmission. In such system, upon a drop in supply pressure, the restrictor acts to more slowly release pressure from the brake than from the transmission.

In order to further actuate the apparatus as thus far described, reference is also made to FIG. 10. Upon initial leftward movement of the plunger 164 by means of actuation of the hand control 188 (FIG. 1), valving spool 72 moves leftwardly against the resilience of the spring 82, but with valving spool 106 moving only slightly leftwardly since the spring 242 is chosen to provide sufficient force to maintain fluid pressure to the brake 38, at this point. During such plunger travel, the plunger 192 (FIGS. 3 and 4) moves generally with the plunger 164 (i.e., spring 200 is not further compressed). Upon sufficient travel of the valving spool 72, conduit 50 opens to conduit 144, and the conduit 144 is blocked off from tank 142, to provide a pressure buildup in the clutch 30 to initiate disengagement thereof. Such application of pressure occurs at about 3 millimeters travel of the plunger 164 from its rightward, or rest position. Similar to the valving spool 106, pressure is built up in the chamber 88 (FIGS. 3 and 5) through the radial ports 100, to act on the slug 84 to limit further leftward movement of the spool 72, i.e., to achieve a balance point of the valving spool 72. As illustrated in FIG. 10, the pressure acting on the slug 84 and within the chamber 88 increases the effort necessary to move the plunger 164 further leftward.

Further movement of the plunger 164 (FIGS. 2 and 3) leftward provides for increase in fluid pressure supplied to the clutch 30 to further disengage the clutch 30, and further release of fluid pressure from the brake 38. Corresponding to about seven and one-half millimeters of travel of the plunger 164, sufficient pressure has been released from the brake 38 to provide for initial engagement of the brake 38. At such point, the pressure supplied to the clutch 30 has not risen quite sufficiently to effect full disengagement of the clutch 30. Further travel of the plunger 164 (FIGS. 2 and 4), with the plunger 192 still moving generally therewith, brings the plunger 192 into contact with shoulder 246 defined by the valve body 62. Such point occurs upon about nine and one-half millimeters of travel of the plunger 164 from its rest position, and because of the preload of the spring 200, a relatively sharp increase in effort is required to move the plunger 164 further leftward. Such point corresponds to full pressure being applied to the clutch 30 to signal the operator that the clutch 30 is fully disengaged. At this point, pressure supplied to the brake 38 has dropped further, and the brake 38 is in a somewhat more engaged state.

Upon contacting of the plunger 192 with the shoulder 246, the plunger 214 (FIGS. 3 and 4), having moved generally with the plunger 164, continues to so move generally with the plunger 164. Providing for such movement is the movement of the plunger 164 from a travel of approximately nine and one-half millimeters to a travel of approximately twenty millimeters by means of the hand control 188 (FIG. 1). Upon the plunger 164 having traveled approximately twenty millimeters leftwardly, a shoulder 248 (FIG. 4) defined by the plunger 214 is brought into contact with a shoulder 250 defined by the plunger 192, and since the spring 218 is in a preloaded condition, the effort necessary to move the plunger 164 further takes a sharp step upward as shown in FIG. 10. Such step is chosen to indicate to the operator that he is approaching a brake mode which is different from the previous one.

Further movement of the plunger 164 compresses both the spring 200 and the spring 218 (FIG. 4).

During movement of the plunger 164, the piston rod 228 (FIGS. 3 and 4) and cylinder 240 have been extending, with the spring 114 extending, with the valving spool 106 being moved at a rate slower than the plunger 164, to apply the brake 38 in a relatively gradual manner. Upon full extension of the rod 228 and cylinder 240, the head 238 contacts an inwardly extending wall 252 defined by the cylinder 240, so that the spring 242 is taken out of the system, and further movement of the plunger 164 moves the valving spool 106 at the same rate of movement as the plunger 164. Thus, further movement of the plunger 164, i.e., occurring at approximately 21 millimeters of travel of the plunger, applies the brake 38 in a relatively more rapid manner. The step in force, of which the operator is aware, signals that such operator is approaching the area wherein relatively more rapid brake engagement will occur upon a given travel of the plunger 164. And, upon full extension of the piston rod 228 and cylinder 240, the spring 242 is removed from the system, so that the operator is aware of a further increase in effort necessary to move the plunger 164 a given distance.

After full leftward travel of the plunger 164, providing for engagement of the brake 38 and disengagement of the clutch 30, the hand control 188 may be released to allow the plunger 164 to move rightwardly under the force of the resilient springs associated therewith. It has been found desirable to control the reengagement of the clutch 30, so that a sudden shock need not be absorbed in the drive train of the vehicle due to sudden engagement of such clutch 30. To accomplish this, a damper sleeve 254 (FIGS. 3 and 4) is disposed about the plunger 164, to be reciprocable thereon. The sleeve 254 is limited in movement in one direction relative to the valve body 62 by a snap ring 258 disposed in a groove defined by the valve body 62, with the sleeve 254 defining an annular rib 260 disposed between such shoulder surface 256 and snap ring 258. In fact, the full rightward movement of the plunger 164 is determined by a radial flange portion 262 (FIG. 3) defined by the plunger 164 contacting the sleeve 254, with the sleeve 254 in turn being limited in movement of such shoulder surface 256 of the valve body 62.

Upon initial leftward movement of the plunger 164, fluid is allowed to flow through a port 264 (FIGS. 3 and 4) in the plunger 164 into an annular recess 266 defined by the inner surface of the sleeve 254, and through an elongated slot 268 (defined by the plunger 164) into a chamber 270 defined by both the plunger 164 and the sleeve 254. Fluid is also allowed to flow into such chamber 270 as the chamber 270 increases in size through small ports 272,273 (FIG. 4), sleeve 254 now drawing away O-ring 274 from shoulder surface 256, such O-ring 274 being fixed to sleeve 254, to allow flow through ports 273. As the plunger 164 moves leftward, increasing the chamber 270 size, the port 264 no longer communicates with the annular recess 266, so that fluid flowing into the chamber 270 flows through ports 272,273. Upon sufficient leftward movement of the plunger 164, fluid is allowd to communicate with the chamber 270 through the slot 268 itself, which has now extended past the leftward end of the sleeve 254.

As stated above, subsequent to full leftward travel of the plunger 164, the controls may be released, and the resilient means associated with the plunger 164 bias the plunger 164 for movement back to the original position thereof. Upon such rightward movement of the plunger 164, it should be noted that fluid may exit from the chamber 270 through both the ports 272 and the slot 268 (O-ring 274 now engaged by shoulder surface 256 to block flow through ports 273). Thus, movement of the valving spool 72 rightward, determined by movement of the actuator means 158, is moved at a certain rate until the slot 268 no longer extends beyond the leftward end of the sleeve 254. As the chamber 270 volume further decreases, fluid may flow therefrom only through the small ports 272, so that movement of the valving spool 72 determined by movement of the plunger 164 is subsequently at a slower rate. The slot 268 and ports 272 are positioned relative to each other to provide that the subsquently slower rate corresponds to substantial release of fluid pressure from the clutch 30 providing for engagement of the clutch 30, so that the clutch engagement takes place in a relatively gradual manner.

As the chamber 270 further decreases in size due to rightward movement of the plunger 164, port 264 is brought into communication with recess 266, allowing fluid to flow from such decreasing size chamber 270 not only through small ports 272, but also through slot 268 and recess 266 and port 264. This provides for relatively more rapid or faster movement of the valving spool 72 upon movement of the plunger 164.

It should be noted that with pressure applied against slug 84 (FIGS. 3 and 5), the valving spool 72 may be moved leftwardly relatively rapidly upon rapid movement of the plunger 164, with the poppet 90 lifting off the seat 94 to allow movement of the slug 84 relatively inwardly of the valving spool 72. The poppet associated with the valving spool 106 (FIGS. 3 and 6) will operate in the same manner if a sudden rightward movement of the valving spool 106 is desired, with pressure being applied to the slug 116.

As set forth above, the apparatus operates in the above-described manner with pressure applied to the chamber 224 (FIGS. 3 and 4) to keep the guide 232 in engagement with the snap ring 236. Release of fluid pressure from such chamber 224 allows the spring 242 and the spring 114 to extend somewhat, moving the guide 232 and rod 228 leftward in FIg. 3. The valving spool 106 is thereby moved leftwardly from a position wherein fluid pressure is supplied to the brake 38 to operate the brake 38, to a position wherein fluid pressure is released from the brake 38 to apply the brake 38. Means are included for selectively applying fluid pressure to and releasing fluid pressure from the chamber 224. Such means are shown in FIGS. 1, 7 and 8.

As shown therein, pressure is supplied from the source through a conduit 300 (FIG. 1) to a parking brake valve 302 and therethrough through a conduit 304 to a transmission controlled valve 306 communicating with the transmission 42 through conduit 308 for providing application of the brakes of the vehicle during a shift of the transmission 42 from forward to reverse. Such transmission controlled valve 306 is described in Application Ser. No. 566,501 entitled "Control System To Apply Vehicle Brakes During A Transmission Directional Shift," assigned to the assignee of this invention. It is to be understood, however, that such transmission controlled valve 306 may be excluded from the apparatus if desired. Fluid pressure is supplied from such transmission controlled valve 306 to brake valves 310,312 (through conduits 314,316) operatively associated with brake pedals 318,320 (FIGS. 1, 2 and 7), one being associated with one valve portion 54 and the other being associated with the other valve portion 58. Each brake valve 310,312 also has conduit means 322 associating it with tank 142. Since the operation of both brake valves 310,312 is the same, in combination with a valve portion associated therewith, only the construction and operation of one will be described in detail.

Figure 8:
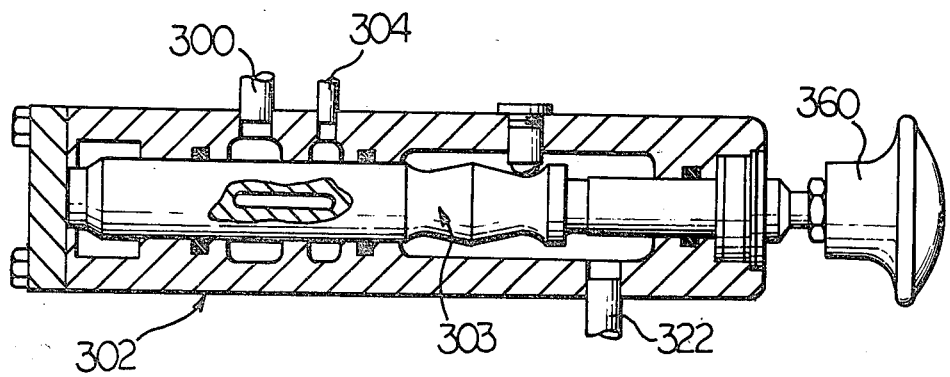
FIG. 8 is a sectional elevation of a portion of the system of FIG. 1 for actuating the brakes of the vehicle in a vehicle parking situation.

With the parking brake valve 302 in the position shown in FIG. 8, fluid pressure is supplied from the source through the valve 302 to the transmission controlled valve 306 and the conduit 314. The conduit 314 communicates with a bore 324 defined by a second valve body 326 of the brake valve 310 (FIG. 7), such bore 324 having a third or additional valving spool 328 reciprocable therewithin. Also movably disposed within the bore 324 is an actuator 330. A helical spring 332 is disposed between a rib 334 defined by the valving spool 328 and an end plate 336 of the valve body 326, and a helical spring 338 is disposed between the actuator 330 and the valving spool 328. The valve body 326 has pivotally fixed thereto a shaft 340 on which an arm 342 is secured. The shaft 340 also has fixed thereto the brake pedal 318. A lever member 344 is secured to the shaft 340, and has a rod 346 pivotally fixed thereto and extending downwardly therefrom. The rod 346 extends through a tubular member 348 fixed relative to the valve body 326, and has a nut 350 fixed to the extending end thereof. A resilient spring 352 bears on an end member 354 fixed to the tubular member 348 and a washer 356 which in turn bears on the nut 350, to urge the rod 346 into a downward position, in turn urging the brake pedal 318 to its upward or second position to in turn urge the valving spool 328 to the leftward position as shown in FIG. 7. In fact, the resilient spring 352 is sufficiently strong to bias the brake pedal 318 into such second position to normally position the brake pedal 318 in such second position and the valving spool 328 in the leftward position against the resilience of the spring 332. However, it will be seen that upon movement of the brake pedal 318 in the opposite downward direction to a first position thereof, the valving spool 328 is moved under the resilience of the spring 332 to a rightward position.

In the leftward position of the valving spool 328, the pressure supplied through conduit 314 to the bore 324 passes through a conduit 358 communicating the bore 324 and the chamber 224 (FIGS. 3 and 4), so that fluid pressure is supplied to the chamber 224 so that in turn the guide 232 is kept in contact with the snap ring 236. Upon pressing of the brake pedal 318, the valving spool 328 is allowed to move rightwardly through the resilience of the spring 332, to provide communication between the chamber 224 (through the conduit 358) and the valve body bore 324, and the conduit 322 communicating the valve body bore 324 to tank. Thus, pressure is released from the chamber 224 to provide that the valving spool 106 is moved leftwardly to dump fluid pressure from the brake 30 so that the brake 30 is applied independently of any movement of the plunger 164 or valving spool 72.

In the operation of the parking brake valve 302, the knob 360 thereof is moved rightwardly (FIG. 8) to move the spool 303 to cut off communication between conduit 300 and conduit 304, and to provide communication between conduit 304 (communicating with brake valve 310) and conduit 322 communicating with tank. Once fluid pressure is released from conduit 314 and thereby from valve 310, fluid pressure is in turn released from chamber 224 to allow leftward movement of the valving spool 106 as described above to apply the brake 38.

Shown in FIGS. 11 and 12 is another embodiment of actuator means 400, in combination with first and second valving spools 402, 404 which operate in a manner as described above. In this embodiment, the actuator means 400 comprise a lever arm 406 with which is associated a push-pull cable 408, the lower end of the lever arm 406 acting on a radial flange 410 defined by a plunger 412 movable along the bore 414 defined by the valve body 416. Plunger 418 is adjacent the plunger 412, and is movable relative thereto along the bore 414 defined by the valve body 416, the plunger 418 being disposed generally within a bore 420 defined by the plunger 412. A helical spring 422 is included for urging the plungers 412,418 relatively apart. Yet another plunger 424 is disposed generally within a bore 426 defined by the plunger 418 and inward of the plunger 412, and a resilient helical spring 428 interconnects the valving spool 402 and the plunger 424. A central passage 430 is provided in the plunger 424. A resilient helical spring 432 interconnects the cap 434 and the valving spool 404, with no spring capsule arrangement being included therein. A resilient helical spring 436 urges the valving spool 402 toward the plunger 424, and a resilient helical spring 438 urges the valving spool 404 toward the plunger 412. As shown, the plunger 418 defines an inner step 440 which engages an outer step 442 defined by the plunger 424, with the parts shown in the rest position as shown in FIG. 11.

The lever arm 406 moves the plunger 412 leftwardly, with the plunger 418 being movable generally therewith upon initial movement of the plunger 412, in turn moving the valving spools 402,404 substantially as described above. Upon sufficient movement of the plunger 412 leftwardly, the plunger 418 is brought into contact with a shoulder 444 defined by the valve body 416, whereupon further movement of the plunger 412 compresses the resilient spring 422. The resilient spring 422 was previously in a preloaded state so that a step in force necessary to move the spools 402,404 further leftwardly will be noticed by the operator of the vehicle.

During such compression of the spring 422, relative movement between the plunger 418 and plunger 412 takes place. If such movement takes place relatively slowly due to relatively slow leftward movement of the plunger 412, fluid will be allowed to exit from the chamber 446 in which helical spring 422 is disposed through a small port 448. However, if sudden leftward movement of the plunger 412 were to take place, i.e., for example if it is desirable to suddenly apply the brakes of the vehicle, fluid pressure buildup in such chamber 446 will force the plunger 424 leftwardly relative to the plunger 412 to allow fluid pressure to flow through the passage 430. Through such means, it is insured that the full brake can be applied rapidly if desired.

A damper sleeve 450 is associated with the plunger 412 in a manner similar to that previously described, with a spring 452 being utilized to maintain the damper sleeve 450 in a fully rightward position relative to the valve body 416. Movement of the plunger 412 leftwardly relative to the damper sleeve 450 initially allows fluid flow into the chamber 454 only through the small ports 456 and the end ports 458 through the channels 460 provided in the plunger 412. Further leftward movement of the plunger 412 relative to the sleeve 450 allows fluid flow into the chamber 454 only through the small ports 456. Even further movement of the plunger 412 relative to the sleeve 450 allows fluid flow into the expanding chamber 454 through lateral passages 462 provided in the sleeve 450. Upon reverse movement of the plunger 412 relative to the sleeve 450, fluid is allowed to exit from the decreasing-size chamber 454 through the ports 456 and the lateral passage 462. Upon a certain degree of relative travel having occurred, the lateral passages 462 are closed, and fluid is allowed to flow from the decreasing-size chamber 454 only through the ports 456. As the plunger 412 approaches its full rightward movement, fluid flow is again allowed from the decreasing-size chamber through the channels 460 and the end ports 458, and also through the ports 456. During that period when fluid is only allowed to flow through the ports 456, it will be understood that the rightward movement of the plunger is relatively slow, as compared to the initial and subsequent movements relative thereto. Such relatively slow movement is chosen to coincide with the engagement of the clutch, so that a sudden engagement thereof does not take place, but rather a gradual engagement thereof is provided.

Figure 13:
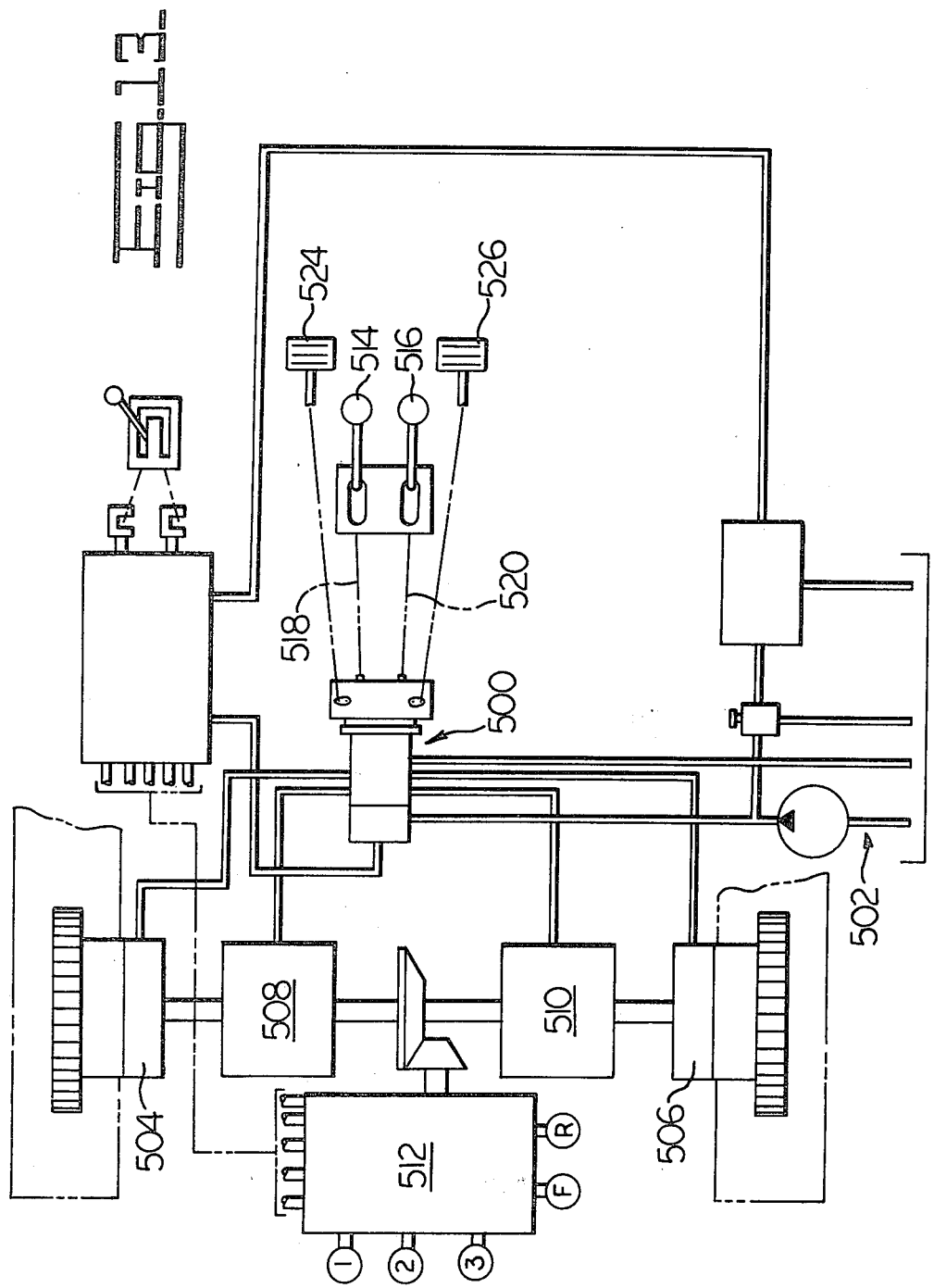
FIG. 13 is a view similar to that shown in FIG. 1, but of an alternate embodiment of overall systems.

In FIGS. 13–15 as shown a system incorporating yet another embodiment of control valve 500. Such control valve 500 is associated with a pressure source 502, brakes 504,506, clutches 508,510, and a transmission 512 in a manner similar to the above-described system. However, in this control valve 500 the hand controls 514,516 operate push-pull cables 518,520 which in turn move bar members (as at 522) in one and the other directions, and the brake pedals 524,526 operate shafts 528,530 which rotate in one and the other directions, each bar and shaft being associated with a brake spool 532 and a clutch spool 534 to actuate the clutch and brake of one side of the vehicle in the manner generally described above. A priority valve 536 is also included, similar to the priority valve described in the first embodiment.

In this embodiment, the second spool 532 is moved leftwardly (FIG. 15) to apply fluid pressure to the brake 504 to release the brake 504, and rightwardly to release fluid pressure from the brake 504 to apply the brake 504. The first or clutch spool 534 is moved rightwardly to release fluid pressure from the clutch 508 to engage the clutch 508, and leftwardly to apply fluid pressure to the clutch 508 to disengage the clutch 508. A link 538 is pivotally mounted relative to the valve body 540 and has a portion 547 thereof operatively associated with the valving spool 534 through a rod 542 and an actuator 544, and a resilient spring 546 interconnecting the actuator 544 and the valving spool 534, so that pivotal movement of the link 538 in a first or clockwise direction moves the valving spool 534 leftwardly, and pivotal movement of the link 538 in a second or counterclockwise direction allows the valving spool 534 to move rightward under the resilience of spring 548. The opposite end 550 of the link 538 has a roller 552 mounted thereon, positioned to rollably associate with a recess 554 defined by the bar 522. The recess 554 of the bar 522 actually defines a ramp surface 556, so that it will be seen that through contacting of the roller 552 with the bar 522, as the bar 522 is moved in a first or rightward direction, pivoting of the link 538 in its first pivotal direction takes place, with the roller 552 riding up the ramp surface 556 outwardly of the bar 522. The ramp surface 556 acts to provide gradual pivoting of the link 538 in the first pivotal direction thereof, to provide for gradual disengagement of the clutch 508. An extended member 558 extends from a plunger 559 which is in turn operatively associated with the valving spool 532, so that movement of the extended member 558 in one direction moves the valving spool 532 to a brake releasing position, and movement of the extended member 558 in the other direction moves the valving spool 532 to a brake applying position. The extended member 558 comprises a substantially T-shaped member 560 as shown. The bar 522 is made up of a body portion 562 and an extending arm portion 564 fixed to the body portion 562, so that upon sufficient movement of the bar 522 in the first direction, the extending arm portion 564 contacts one limb 566 of the T-shaped member 560. Thus, upon sufficient movement of the bar 522 in a first direction, rightwardly as shown in FIG. 15, the clutch spool 534 is moved to a position to disengage the clutch 508, and the brake spool 532 is moved to a position to engage the brake 504.

Shaft 530, as stated above, is rotatably mounted relative to the valve body 540, and a lug 568 is fixed to the shaft 530 to be movable therewith. The shaft 530 is biased so that the lug 568 is in a leftward position as shown in FIG. 15, and upon actuation of the brake pedal 524, the shaft 530 rotates to bring the lug 568 into contact with the other limb 570 of the T-shaped member 560 to move the valving spool 532 to determine a braking position. Such actuation is independent of any movement of the bar 522. It will thus be seen that the brake may be selectively applied even with the clutch engaged. It will be understood that the other valve portion of valve 500 includes clutch and brake valving spools for association with the opposite side clutch 510 and brake 506 of the vehicle.

We claim:

1. In a vehicle in which driving force is applied to both sides thereof, including brake systems associated respectively with both sides thereof and responsive to fluid pressure from a source thereof, each brake system associated with a side of the vehicle comprising brake means actuatable to brake that side of the vehicle, and releasable to release that side of the vehicle, a control apparatus for each brake system comprising:

valve means comprising a valve body and a valving spool movably disposed in a bore defined by the valve body;

means for providing fluid communication between said source and said valve body bore;

means for providing fluid communication between said valve body bore and said brake means;

means for providing fluid communication from said valve body bore and through which pressure may be released from said valve body bore;

the valving spool being movable to first and second positions relative to said valve body, the valving spool in said first position providing communication of fluid pressure from said source through said means for providing fluid communication between said source and said valve body bore, through said means for providing fluid communication between said valve body bore and said brake means, to said brake means, the valving spool in the second position allowing release of fluid pressure from said brake means through said means for providing fluid communication between said valve body bore and said brake means, and said means for providing fluid communication from said valve body bore, and through which pressure may be released;

wherein the brake means are applied upon release of fluid pressure therefrom, and released upon application of fluid pressure thereto;

actuator means, and means operatively coupled with said actuator means and valving spool so that movement of said actuator means in one direction provides movement of said valving spool to its first position, and movement of the actuator means in another direction provides movement of the valving spool to its second position; and means operatively associated with said valving spool for selectively providing movement of said valving spool to said second position to allow release of fluid pressure from said brake means, independently of the movement of the actuator means.

2. The apparatus of claim 1 wherein the actuator means comprise an actuator assembly comprising plunger means movable along said bore defined by said valve body, the plunger means defining a chamber, and further wherein the actuator assembly comprises a slug reciprocably disposed within a bore defined by the plunger means, said bore defined by the plunger means communicating with said chamber, and further comprising resilient means operatively associated with said valving spool and said valve body for urging the valving spool toward said plunger means, and further wherein said means operatively coupling said actuator means and valving spool comprise means operatively coupling said plunger means and slug and said valving spool so that upon release of fluid pressure from said chamber, from a pressurized state thereof, the valving spool is allowed to move relatively toward the plunger means under the urging of said resilient means operatively associated with the valving spool and valve body, and further comprising means for selectively applying fluid pressure to and releasing fluid pressure from said chamber.

3. The apparatus of claim 2 wherein said means for selectively applying fluid pressure to and selectively releasing fluid pressure from said chamber comprise second valve means comprising a second valve body and an additional valving spool reciprocable within a bore defined by the second valve body, and further comprising fifth means for providing fluid communication between said second valve body bore and said chamber, sixth means for providing fluid communication between said source and said second valve body bore, and seventh means for providing fluid communication from said second valve body bore and through which pressure may be released from said second valve body bore, the additional valving spool being movable within said bore defined by the second valve body to a first position, wherein fluid pressure is communicated from said source through said sixth means for communicating fluid pressure, and through said fifth means for providing fluid communication, to said chamber, and movable to a second position wherein fluid pressure is released from said chamber through said fifth means for providing fluid communication and through said seventh means for providing fluid communication, and means for selectively moving said additional valving spool from its second to its first position.

4. The apparatus of claim 3 wherein the means for moving said additional valving spool to the first and second positions thereof comprise brake pedal means operatively mounted to the vehicle.

5. The apparatus of claim 4 and further comprising resilient means operatively associated with said additional valving spool second valve body, for urging said additional valving spool from the first toward the second position thereof, the brake pedal means being movable to a first position allowing said resilient means operatively associated with said additional valving spool and second valve body to move said additional valving spool toward the second position thereof, the brake pedal means being movable to a second position to move the additional valving spool against the resilience of the resilient means operatively associated with said additional valving spool and second valve body to the first position thereof, and resilient means operatively associated with said brake pedal means for biasing said brake pedal means in the second position thereof, said biasing resilient means applying sufficient force to said brake pedal means to normally position the brake pedal means in the second position thereof and the additional valving spool in the first position thereof.

6. In a vehicle in which driving force is applied to both sides thereof, including brake systems associated respectively with both sides thereof and responsive to fluid pressure from a source thereof for steering of the vehicle, each brake system associated with a side of the vehicle comprising brake means actuatable to brake that side of the vehicle, and releasable to release that side of the vehicle, a control apparatus for each brake system comprising:

a valve comprising a valve body defining a bore, and a valving spool movably disposed within and along said bore;

the valving spool being movable within said bore to a first position wherein the brake means are released, and to a second position wherein said brake means are applied;

actuator means movably associated with said valve body; and means operatively associated with said actuator means and valving spool for providing that, upon initial movement of the actuator means to provide movement of the valving spool from the first toward the second position thereof, the valving spool is moved at a rate slower than said actuator means, so that the brake means are applied in a relatively gradual manner, and for further providing that upon further movement of said actuator means to provide movement of the valving spool from the first toward the second position thereof, the valving spool moves with the actuator means at the same rate thereof to apply the brakes in a relatively more rapid manner.

7. The apparatus of claim 6 wherein said means operatively associated with said actuator means and valving spool comprise resilient means operatively interconnecting the valving spool and the valve body to urge the valving spool toward its second position, and resilient means operatively interconnecting the actuator means and valving spool to urge them relatively apart, and piston and cylinder means, one of which is operatively coupled with said actuator means and the other of which is operatively coupled with said valving spool, wherein upon said initial movement of said actuator means to provide movement of the valving spool from the first toward the second position thereof, the piston means move relative to the cylinder means, and wherein upon full extension of the piston and cylinder means, the valving spool moves along with said plunger means at the same rate of movement thereof.

8. The apparatus of claim 7 wherein said resilient means operatively interconnecting said actuator means and valving spool comprise helical spring means disposed about said piston and cylinder means.

9. The apparatus of claim 8 wherein, with the piston and cylinder means fully extended, the piston contacts an inwardly extending wall defined by said cylinder means.

* * * * *